(12) United States Patent
Tellex et al.

(10) Patent No.: US 11,034,019 B2
(45) Date of Patent: Jun. 15, 2021

(54) SEQUENCE-TO-SEQUENCE LANGUAGE GROUNDING OF NON-MARKOVIAN TASK SPECIFICATIONS

(71) Applicant: Brown University, Providence, RI (US)

(72) Inventors: Stefanie Tellex, Cambridge, MA (US); Dilip Arumugam, Providence, RI (US); Nakul Gopalan, Providence, RI (US); Lawson L. S. Wong, Sar (HK)

(73) Assignee: Brown University, Providence, RI (US)

( * ) Notice: Subject to any disclaimer, the term of this patent is extended or adjusted under 35 U.S.C. 154(b) by 16 days.

(21) Appl. No.: 16/388,651

(22) Filed: Apr. 18, 2019

(65) Prior Publication Data

US 2020/0023514 A1 Jan. 23, 2020

Related U.S. Application Data

(60) Provisional application No. 62/660,063, filed on Apr. 19, 2018.

(51) Int. Cl.
| | |
|---|---|
| *G10L 21/00* | (2013.01) |
| *B25J 9/16* | (2006.01) |
| *G10L 15/22* | (2006.01) |
| *G06N 3/04* | (2006.01) |
| *G06N 3/08* | (2006.01) |

(52) U.S. Cl.
CPC ............ *B25J 9/163* (2013.01); *G06N 3/0472* (2013.01); *G06N 3/08* (2013.01); *G10L 15/22* (2013.01); *G10L 21/00* (2013.01); *G06N 3/0445* (2013.01); *G10L 2015/223* (2013.01)

(58) Field of Classification Search
CPC ................................ G10L 15/22; G10L 21/00
See application file for complete search history.

(56) References Cited

U.S. PATENT DOCUMENTS

| 8,689,192 B2* | 4/2014 | Dargelas | G06F 40/51 |
| | | | 717/137 |
| 2013/0085974 A1* | 4/2013 | Osogami | G06N 7/005 |
| | | | 706/46 |
| 2017/0323636 A1* | 11/2017 | Xiao | G06F 40/289 |

FOREIGN PATENT DOCUMENTS

CN          103383569 A   * 11/2013

OTHER PUBLICATIONS

Andreas, et al., "Alignment-based Compositional Semantics for Instruction Following", Proceedings of the 2015 Conference on Empirical Methods in Natural Language Processing, Sep. 17-21, 2015, pp. 1165-1174.
Arumugam, et al., "Accurately and Efficiently Interpreting Human-Robot Instructions of Varying Granularities", Robotics: Science and Systems, Apr. 21, 2017, 10 pages.
Bacchus, et al., "Rewarding Behaviors", AAAI'96: Proceedings of the thirteenth national conference on Artificial intelligence, vol. 2, Aug. 1996, pp. 1160-1167. (English Abstract Only).

(Continued)

*Primary Examiner* — Feng-Tzer Tzeng
(74) *Attorney, Agent, or Firm* — Adler Pollock & Sheehan P.C.

(57) ABSTRACT

A method includes enabling a robot to learn a mapping between English language commands and Linear Temporal Logic (LTL) expressions, wherein neural sequence-to-sequence learning models are employed to infer a LTL sequence corresponding to a given natural language command.

4 Claims, 2 Drawing Sheets
(1 of 2 Drawing Sheet(s) Filed in Color)

| Example Command | GLTL Expression |
|---|---|
| Go to the green room. | $\lozenge G$ |
| Go into the red room. | $\lozenge R$ |
| Enter blue room via green room. | $\lozenge(G \wedge \lozenge B)$ |
| Go through the yellow or red room, and enter the blue room | $\lozenge((R \vee Y) \wedge \lozenge B)$ |
| Go to the blue room but avoid the red room. | $\lozenge B \wedge \neg \square R$ |
| While avoiding yellow navigate to green. | $\lozenge G \wedge \neg \square Y$ |
| Scan for blocks and insert any found into bin. | $\square((S \mathcal{U} \neg A) \wedge \lozenge A)$ |
| Look for and pick up any non red cubes and put them in crate. | $\square((S \mathcal{U} \neg N_R) \wedge \lozenge N_R)$ |

(56) References Cited

OTHER PUBLICATIONS

Bahdanau, et al., "Neural Machine Translation by Jointly Learning to Align and Translate", In International Conference on Learning Representations, Sep. 1, 2014, 15 pages.
Bellman, "A Markovian Decision Process", Journal of Mathematics and Mechanics, vol. 6, Issue 5, 1957, pp. 679-684.
Bengio, et al., "A Neural Probabilistic Language Model", Journal of Machine Learning Research, vol. 3, 2003, pp. 1137-1155.
Boteanu, et al., "A Model for Verifiable Grounding and Execution of Complex Natural Language Instructions", 2016 IEEE/RSJ International Conference on Intelligent Robots and Systems (IROS), Oct. 9-14, 2016, 3 pages. (English Abstract Only).
Brooks, et al., "Make It So: Continuous, Flexible Natural Language Interaction with an Autonomous Robot", Association for the Advancement of Artificial Intelligence, 2012, pp. 2-8.
Chen, et al., "Learning to Interpret Natural Language Navigation Instructions from Observations", Association for the Advancement of Artificial Intelligence, Aug. 2011, pp. 859-865.
Cho, et al., "Learning Phrase Representations using RNN Encoder-Decoder for Statistical Machine Translation", Proceedings of the 2014 Conference on Empirical Methods in Natural Language Processing (EMNLP), Oct. 25-29, 2014, pp. 1724-1734.
Chung, et al., "On the Performance of Hierarchical Distributed Correspondence Graphs for Efficient Symbol Grounding of Robot Instructions", 2015 IEEE/RSJ International Conference on Intelligent Robots and Systems (IROS), Sep. 28-Oct. 2, 2015, 3 pages. (English Abstract Only).
Courcoubetis, et al., "The Complexity of Probabilistic Verification", Journal of the Association for Computing Machinery, vol. 42, Issue 4, Jul. 1995, pp. 857-907. (English Abstract Only).
Diuk, et al., "An Object-Oriented Representation for Efficient Reinforcement Learning", Proceedings of the 25th International Conference on Machine Learning, Jul. 2008, pp. 240-247.
Dzifcak, et al., "What to Do and How to Do It: Translating Natural Language Directives Into Temporal and Dynamic Logic Representation for Goal Management and Action Execution", Proceedings—IEEE International Conference on Robotics and Automation, Nov. 2, 2009, pp. 4163-4168. (English Abstract Only).
Graves, "Generating Sequences With Recurrent Neural Networks", arXiv:1308.0850, Jun. 5, 2014, 43 pages.
Hansson, et al., "A Logic for Reasoning About Time and Reliability", Formal Aspects of Computing, vol. 6, Issue 5, Sep. 1994, pp. 512-535. (English Abstract Only).
Hochreiter, et al., "Long Short-term Memory", Neural Computation, vol. 9, Issue 8, 1997, pp. 1735-1780.
Howard, et al., "A Natural Language Planner Interface for Mobile Manipulators", In Proceedings of the IEEE International Conference on Robotics and Automation (ICRA 2014), 2014, 8 pages.
Karamcheti, et al., "A Tale of Two DRAGGNs: A Hybrid Approach for Interpreting Action-Oriented and Goal-Oriented Instructions", Proceedings of the First Workshop on Language Grounding for Robotics, Jul. 30-Aug. 4, 2017, pp. 67-75.
Kingma, et al., "Adam: a Method for Stochastic Optimization", arXiv:1412.6980, Jan. 30, 2017, 15 pages.
Koehn, et al., "Six Challenges for Neural Machine Translation", Proceedings of the First Workshop on Neural Machine Translation, Aug. 4, 2017, pp. 28-39.
Kress-Gazit, et al., "From Structured English to Robot Motion", Proceedings of the 2007 IEEE/RSJ International Conference on Intelligent Robots and Systems, Dec. 1, 2007, pp. 2717-2722. (English Abstract Only).
Kress-Gazit, et al., "Synthesis for Robots: Guarantees and Feedback for Robot Behavior", Annual Review of Control, Robotics, and Autonomous Systems, vol. 1, Jan. 19, 2018, pp. 211-236. (English Abstract Only).
Kress-Gazit, et al., "Temporal-logic-based Reactive Mission and Motion Planning", IEEE Transactions on Robotics, vol. 25, Issue 6, Dec. 1, 2009, pp. 1370-1381. (English Abstract Only).
Kress-Gazit, et al., "Translating Structured English to Robot Controllers", Advanced Robotics, vol. 22, Issue 12, Oct. 1, 2008, pp. 1343-1359. (English Abstract Only).
Lake, et al., "Generalization Without Systematicity: On the Compositional Skills of Sequence-to-sequence Recurrent Networks", Proceedings of the 35 th International Conference on Machine Learning, Jun. 6, 2018, 12 pages.
Liang, "Learning Executable Semantic Parsers for Natural Language Understanding", Communications of the Association for Computing Machinery, vol. 59, Issue 9, Aug. 2016, pp. 68-76.
Lignos, et al., "Provably Correct Reactive Control From Natural Language", Autonomous Robots, vol. 38, 2015, pp. 89-105.(English Abstract Only).
Littman, et al., "Environment-Independent Task Specifications via GLTL", arXiv:1704.04341, Apr. 14, 2017, 8 pages.
Littman, et al., "On the Complexity of Solving Markov Decision Problems", UAI'95: Proceedings of the Eleventh conference on Uncertainty in artificial intelligence, Aug. 1995, pp. 394-402.
Loizou, et al., "Automatic synthesis of multi-agent motion tasks based on LTL specifications", 2004 43rd IEEE Conference on Decision and Control (CDC) (IEEE Cat. No. 04CH37601), Dec. 14-17, 2004, 3 pages.(English Abstract Only).
Luong, et al., "Effective Approaches to Attention-based Neural Machine Translation", Proceedings of the 2015 Conference on Empirical Methods in Natural Language Processing, Sep. 17-21, 2015, pp. 1412-1421.
Macglashan, et al., "Grounding English Commands to Reward Functions", 2015, 10 pages.
Macmahon, et al., "Walk the Talk: Connecting Language, Knowledge, and Action in Route Instructions", National Conference on Artificial Intelligence, Jul. 16-20, 2006, pp. 1475-1482.
Manna, et al., "The Temporal Logic of Reactive and Concurrent Systems", Specification, 1992, 11 pages.
Mei, et al., "Listen, Attend, andWalk: Neural Mapping of Navigational Instructions to Action Sequences", Proceedings of the Thirtieth AAAI Conference on Artificial Intelligence (AAAI-16), Feb. 2016, pp. 2772-2778.
Misra, et al., "Mapping Instructions and Visual Observations to Actions with Reinforcement Learning", Proceedings of the 2017 Conference on Empirical Methods in Natural Language Processing, Sep. 7-11, 2017, pp. 1004-1015.
Papadimitriou, et al., "The Complexity of Markov Decision Processes", Mathematics of Operations Research, vol. 12, Issue 3, Aug. 1987, pp. 441-450.
Paszke, et al., "Automatic Differentiation in Pytorch", 31st Conference on Neural Information Processing Systems (NIPS 2017), 2017, 4 pages.
Paul, et al., "Efficient Grounding of Abstract Spatial Concepts for Natural Language Interaction With Robot Platforms", vol. 37, Issue 10, Sep. 1, 2018, pp. 1269-1299.(English Abstract Only).
Pnueli, "The Temporal Logic of Programs", SFCS '77: Proceedings of the 18th Annual Symposium on Foundations of Computer Science, Sep. 1977, pp. 46-57.(English Abstract Only).
Puterman, "Markov Decision Processes: Discrete Stochastic Dynamic Programming", Jan. 1994, 672 pages. (English Abstract Only).
Quigley, et al., "Ros: An Open-source Robot Operating System", In IEEE International Conference on Robotics and Automation Workshop on Open Source Software, 2009, 6 pages.
Raman, et al., "Sorry Dave, I'm Afraid I Can't Do That: Explaining Unachievable Robot Tasks Using Natural Language", Robotics: Science and Systems 2013, Jun. 2013, 8 pages.
Srivastava, et al., "Dropout: A Simple Way to Prevent Neural Networks from Overfitting", Journal of Machine Learning Research, vol. 15, 2014, pp. 1929-1958.
Sutskever, et al., "Sequence to Sequence Learning with Neural Networks", NIPS'14: Proceedings of the 27th International Conference on Neural Information Processing Systems, vol. 2, Dec. 2014, pp. 3104-3112.
Tellex, et al., "Understanding Natural Language Commands for Robotic Navigation and Mobile Manipulation", Proceedings of the Twenty-Fifth AAAI Conference on Artificial Intelligence, 2011, pp. 1507-1514.

(56) References Cited

OTHER PUBLICATIONS

Vasile, et al., "Time Window Temporal Logic", Theoretical Computer Science, vol. 691, Aug. 29, 2017, pp. 27-54. (English Abstract Only).

Williams, et al., "A Learning Algorithm for Continually Running Fully Recurrent Neural Networks", Neural Computation, vol. 1, Issue 2, Jun. 1989, pp. 270-280. (English Abstract Only).

Zettlemoyer, et al., "Learning to Map Sentences to Logical Form: Structured Classification With Probabilistic Categorial Grammars", UAI'05: Proceedings of the Twenty-First Conference on Uncertainty in Artificial Intelligence, Jul. 2005, pp. 658-666. (English Abstract Only).

\* cited by examiner

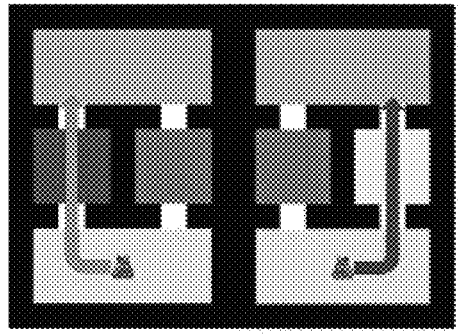

FIG. 1

| Example Command | GLTL Expression |
|---|---|
| Go to the green room. | $\lozenge G$ |
| Go into the red room. | $\lozenge R$ |
| Enter blue room via green room. | $\lozenge(G \wedge \lozenge B)$ |
| Go through the yellow or red room, and enter the blue room | $\lozenge((R \vee Y) \wedge \lozenge B)$ |
| Go to the blue room but avoid the red room. | $\lozenge B \wedge \neg \square R$ |
| While avoiding yellow navigate to green. | $\lozenge G \wedge \neg \square Y$ |
| Scan for blocks and insert any found into bin. Look for and pick up any non red cubes and put them in crate. | $\square((SU \neg A) \wedge \lozenge A)$ $\square((SU \neg N_R) \wedge \lozenge N_R)$ |

FIG. 2

| | Domain #1 | | Domain #2 | |
| | Original | Expanded | Original | Expanded |
|---|---|---|---|---|
| Seq2Seq | 93.10 ± 1.60% | 95.25 ± 0.30% | 86.09 ± 1.03% | 93.42 ± 0.96% |
| Seq2Seq + Bahdanau Attention | 93.45 ± 0.60% | 95.51 ± 0.11% | 87.15 ± 0.36% | 93.78 ± 0.29% |
| Seq2Seq + Encoder-Agnostic Attention | 93.18 ± 0.94% | 94.98 ± 0.30% | 86.47 ± 0.72% | 93.92 ± 0.44% |

FIG. 3

SEQUENCE-TO-SEQUENCE LANGUAGE GROUNDING OF NON-MARKOVIAN TASK SPECIFICATIONS

CROSS REFERENCE TO RELATED APPLICATIONS

This application claims benefit from U.S. Provisional Patent Application Ser. No. 62/660,063, filed Apr. 19, 2018, which is incorporated by reference in its entirety.

STATEMENT REGARDING GOVERNMENT INTEREST

This invention was made with government support under grant number 1637614 awarded by the National Science Foundation, grant numbers W911NF-15-1-0503 awarded by the U.S. Army Research Office, grant number D15AP00102 awarded by the Defense Advanced Research Projects Agency and grant number NNX16AR61G awarded by National Aeronautics and Space Administration. The government has certain rights in the invention.

BACKGROUND OF THE INVENTION

The invention generally relates to robotics, and more specifically to sequence-to-sequence language grounding of non-Markovian task specifications.

In general, the broad spectrum of tasks that humans would like to see interpreted and executed by robots extends beyond realizing a particular goal configuration. A slightly richer space of tasks includes those that are looking to induce a constrained or repetitive robot execution. In the former category, a person may instruct a robot in the home to "go down the right side of the hallway and to the bedroom," restricting the space of possible paths the robot might take to reach its destination. Similarly, a command in the latter category may be "watch the sink for dirty dishes and clean any that you see," implying that the robot should enter a loop of repeatedly scanning for dirty dishes and cleaning any that appear. A robot system that can adequately represent and enable untrained users to express these complex behaviors would constitute a huge step forward in the area of human-robot interaction.

Existing approaches such as Linear Temporal Logic (LTL) allow these behaviors to be expressed as formal logical functions, enabling the automatic generation of robot controllers to execute these behaviors. While incredibly powerful, the average, non-expert user cannot be expected to hold the requisite knowledge for expressing arbitrarily complex behaviors via LTL. Consequently, we turn to natural language s a familiar interface through which non-expert users may convey their intent and desires while escaping the need for low-level programming knowledge. Unfortunately, due to the rich underlying semantics of LTL, there is no existing approach that takes open-ended natural language commands and maps directly to general LTL expressions.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including enabling a robot to learn a mapping between English language commands and Linear Temporal Logic (LTL) expressions, wherein neural sequence-to-sequence learning models are employed to infer a LTL sequence corresponding to a given natural language command.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present invention will become better understood with reference to the following description, appended claims, and accompanying drawings where:

FIG. 1 illustrates sample images provided to Amazon Mechanical Turk (AMT) annotators.

FIG. 2 illustrates examples of natural language commands and their corresponding GLTL.

FIG. 3 illustrates a table of sample language grounding accuracy means and standard deviations.

DETAILED DESCRIPTION

Figure 4:
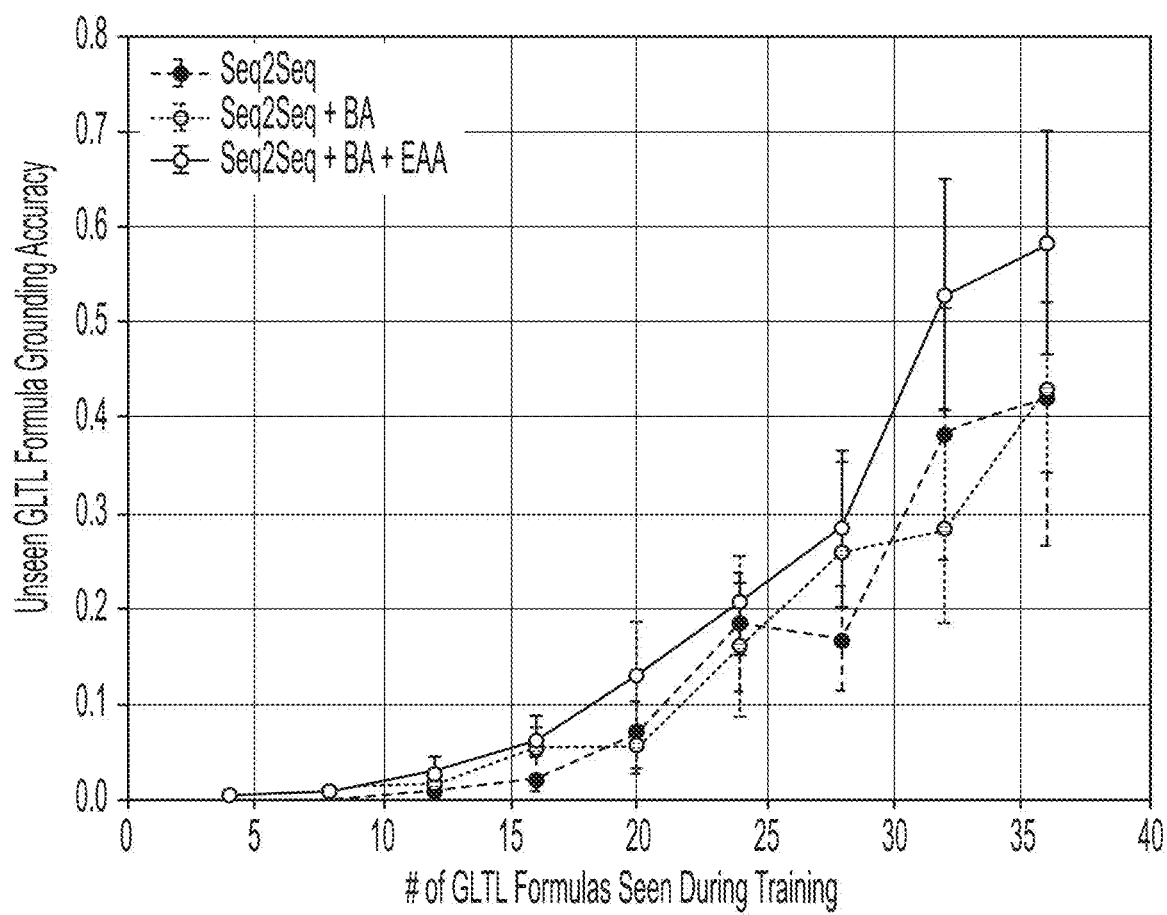
FIG. 4 illustrates example test results.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In general, natural language commands issued to robots not only specify a particular target configuration or goal state but also outline constraints on how the robot goes about its execution. That is, the path taken to achieving some goal state is given equal importance to the goal state itself. One example of this could be instructing a wheeled robot to "go to the living room but avoid the kitchen," in order to avoid scuffing the floor. This class of behaviors poses a serious obstacle to existing language understanding for robotics approaches that map to either action sequences or goal state representations. Due to the non-Markovian nature of the objective, approaches in the former category must map to potentially unbounded action sequences whereas approaches in the latter category would require folding the entirety of a robot's trajectory into a (traditionally Markovian) state representation, resulting in an intractable decision-making problem. To resolve this challenge, the present invention uses probabilistic variant of Linear Temporal Logic (LTL) as a goal specification language for a Markov Decision Process (MDP). We show that standard neural sequence-to-sequence learning models can successfully ground language to this semantic representation, and also provide analysis that highlights generalization to novel, unseen logical forms as an open problem for this class of model.

The present invention enable a robot to learn a mapping between English commands and LTL expressions and includes a dataset that maps between English and LTL in a model environment. Neural sequence-to-sequence learning models are used to infer the LTL sequence corresponding to a given natural language input sequence.

In order to fully specify our system for converting natural language to robot behavior herein, we begin by describing our problem setting and clarify its connection to the Geometric LTL (GLTL) semantic representation inferred by our grounding model. We then outline the recurrent neural network architectures used for mapping between natural language and GLTL expressions.

We formalize the problem of language grounding within the context of an Object-oriented Markov Decision Process (OO-MDP). A Markov Decision Process (MDP) is a five-tuple (S, A, R, T, γ) where S defines the robot state space, A specifies the actions available to the robot, R encodes the underlying task through numerical rewards defined for each state-action pair, T defines the probabilistic transition dynamics of the environment, and γ is a discount factor. Given an MDP as input, a planning algorithm produces a policy that maps from states to robot actions. Building on the MDP formalism, an OO-MDP refines the notion of state to be a collection of object classes, each with their own set of attributes. Additionally, the OO-MDP framework includes a set of propositional logic functions, parameterized by instances of object classes, that can be used to query objects within the OO-MDP state.

We treat natural language as the specification of a latent reward function that completes the definition of an otherwise fully-specified MDP. We use a language grounding model to arrive at a more consolidated, semantic representation of that reward function, thereby completing the MDP and allowing it to be passed to an arbitrary planning algorithm for generating robot behavior. More specifically, we think of each natural language command as specifying some latent LTL formula encoding the desired behavior. The OO-MDP propositional functions serve as possible atoms of the LTL expressions, creating an expressive language for defining tasks. In particular, LTL formulae are sufficiently expressive to subsume semantic representations used in previous goal-based language grounding work.

Linear temporal logic has the following grammatical syntax:

φ:=atom|¬φ|φ∧ψ|φ∨ψ|#φ|◇φ|φUφ|φ atom denotes an atomic proposition; ¬, ∧, and ∨ are logical "not", "and", and "or"; # denotes "always", ◇ denotes "eventually", U denotes "until", and denotes "next".

In order to handle the task of translating from natural language to GLTL expressions, we turn to recent neural-network architectures for sequence learning that have already proven to be incredibly performant in other machine translation tasks. We are presented with a sequence taken from some source language $x=[x_1, \ldots, x_N]$ and would like to infer a corresponding sequence of some target language $y=[y_1, \ldots, y_M]$. Given a translation model with parameters θ, we look to identify the most likely target sequence and decompose its corresponding probability into the product of partial translation probabilities:

$$p(y|x, \theta) = \prod_{m=1}^{M} p(y_m | x, y_{<m}, \theta) \quad (1)$$

where $y_{<m}=[y_1, \ldots, y_{m-1}]$.

Treating the space of natural language commands as a source language and GLTL expressions as a target language, we collect a parallel corpus and optimize the neural-network architecture parameters θ. Specifically, we leverage a recurrent neural network (RNN) encoder-decoder framework.

Widely used across a variety of natural language tasks, RNNs are models that map sequential inputs to high-dimensional output spaces, using recurrent cells that maintain an internal or hidden-state representation of the sequence processed thus far. Neural sequence-to-sequence learning use two distinct RNN models, an encoder and decoder, to map between source and target language sequences. An encoder processes an input sequence and, for each input token, produces an output and an updated hidden state. While the hidden state stores a global summary of the overall sequence, the output encodes local information computed from the current hidden state and the current input token. After all input tokens are fed to the encoder, there is a resulting sequence of encoder outputs and hidden states. Subsequently, a decoder model generates target language sequences by mapping an input target language symbol to a probability distribution over the target language vocabulary. Connecting the two models is the final hidden state of the encoder RNN cell (that is, the hidden state after processing the entire input sequence) which is used to initialize the hidden state of the decoder RNN cell. The encoder hidden state is initialized with an all zeros vector and a special start token is fed as the first input to the decoder in order to initialize decoding.

In both the encoder and decoder of our system, we use the Gated Recurrent Unit (GRU) as the core RNN cell. Briefly, a GRU is one type of RNN cell that, using the previous hidden state $s_{t-i}$ and current input $x_t$, performs the following computations:

$$\text{Reset gate: } r_t = \sigma(W_r \cdot x_t + U_r \cdot s_{t-1} + b_r) \quad (2)$$

$$\text{Output: } g_t = \tanh(W_g \cdot x_t + U_g \cdot (r_t \odot s_{t-1}) + b_g) \quad (3)$$

$$\text{Update gate: } z_t = \sigma(W_z \cdot x_t + U_z \cdot s_{t-1} + b_z) \quad (4)$$

$$\text{State update: } s_t = (1 - x_t) \odot s_{t-1} + z_t \odot g_t \quad (5)$$

resulting in an output vector $g_t$ and a new hidden state $s_t$ where (·) and ((·)) denote matrix-vector and Hadamard products respectively. Intuitively, $r_t$ is a "reset" gate affecting how hidden state information is combined with the current input to produce the cell output, $g_t$, and $z_t$ is an "update" gate negotiating how much information is preserved within the hidden state. All parameters in bold denote trainable parameters of the cell that are optimized during training of the entire architecture via backpropagation.

Given the GRU encoder and decoder, $f_{enc}$ and $f_{dec}$, words of the input sequence are first mapped to their corresponding vector representations via an embedding lookup. Intuitively, since the individual tokens can simply be represented as integers, the word embeddings provide a high-dimensional representation that is optimized as part of the neural network and can be used to capture semantic information about each individual word. Feeding each input embedding, $\hat{x}_j$, in sequence produces a corresponding sequence of encoder outputs, $[h_1, \ldots, h_N]$, and hidden states $[s_1, \ldots, s_N]$, where each $h_j$, $s_1$ comes from:

$$h_j, s_j = f_{enc}(s_{j-1}, \hat{x}_j) \quad (6)$$

Once the input sequence has been processed, the final encoder hidden state, $s_N$ is used to initialize the RNN cell of the decoder. During decoding, the previously inferred token of the output sequence is mapped to a probability distribution over the target vocabulary from which the next output token is sampled:

$$p(y_i|x,y_{<m},\theta)=f_{dec}(v_{i-1},\hat{y}_{i-1}) \quad (7)$$

Here denotes the embedding for the previously decoded token, $\hat{y}_{i-1}$. We use a greedy decoding scheme and treat the token in the distribution with highest probability as the inferred token, $\hat{y}_i$.

Subsequent work by Bandanau proposed learning a weighting or attention scheme to selectively utilize encoder output information during decoding. The resulting Bandanau attention mechanism reparameterizes the decoder as a function of the previous token embedding and a context vector. At each step of decoding, the context vector weights the information of the encoder outputs $[h_1, \ldots, h_N]$ according to:

$$c_i = \sum_{j=1}^{N} \alpha_{i,j} h_j \quad (8)$$

where $\alpha_i$ is a weight on the information carried in $h_j$. The individual attention weights are computed as outputs of a feedforward neural network, $a(v_i, [h_1, \ldots, h_N])$, with a final softmax activation and where $v_i$ is the current hidden state of the decoder RNN cell. Accordingly, decoding occurs by greedily sampling the next token distribution:

$$p(y_i|x,y_{<m},\theta)=f_{dec}(v_{i-1},\hat{y}_{i-1},c_i) \quad (9)$$

Even with alternatives to Bandanau attention, attention weights are typically computed as a function of the current decoder hidden state and the encoder outputs. Given the rigid structure of GLTL as a target output language, we examined an alternative attention mechanism that computes attention weights purely as a function of decoder parameters. More formally, we use an encoder-agnostic attention mechanism where each attention weight $\alpha_i$ is computed by a feedforward neural network $a(\hat{y}_{i-1}, v_i)$ that takes the previously decoded token embedding and the current decoder hidden state as inputs. This attention scheme captures the idea that the previously decoded token and current state of the target translation generated thus far offer a clearer signal for weighting the encoder outputs than the encoder outputs themselves. Although seemingly counterintuitive, we considered a particular scenario where the sequence-to-sequence grounding model must generalize to a language command at test time that corresponds to a novel GLTL expression never seen during training. Instead of being subject to the learned mechanics of the source language that may vary dramatically at test time, the encoder-agnostic attention scheme would maintain focus on the GLTL target language side that exhibits significantly less variation and follows a small, well-defined lexicon.

Unlike the architecture outlined in Bandanau, we found a single, forward RNN encoder was sufficient for our task and opted not to use a bi-directional RNN encoder in favor of reduced training time and sample complexity. All models were implemented in PyTorch and trained using the Adam optimizer with a learning rate of 0.001. Embedding and RNN output sizes were set to 50 and 256 units respectively. Additionally, we made use of dropout regularization before and after both the encoder and decoder GRUs with a keep probability of 0.8. We found that reversing all input sequences provided a small increase in grounding accuracy. For each training sample, a random choice was made between providing the ground truth output token, y, (teacher forcing) and providing the actual decoded symbol, $\hat{y}$, with 0.5 probability.

The following describes the two domains used for evaluating our approach as well as the details of our data collection procedure for training three presented grounding models.

Mobile Manipulation Robot Domain

Cleanup World includes a single robot agent acting within an environment characterized by distinctly colored rooms and movable objects. We chose this domain for our experiments as it allows us to express a wide variety of constrained execution tasks. For the purposes of our experiments, these restrictions took on one of two forms: the robot would need to reach it's target destination by either passing through or explicitly avoiding a particular room in the environment.

Pick-and-Place Domain

In order to showcase instances of repetitive robot execution, we designed a pick-and-place domain where a robot is meant to patrol the environment waiting for sudden events that trigger some desired behavior. More concretely, the domain is defined by distinct table and bin regions where colored blocks may reside. These blocks have only two attributes: first for location, table or bin; second for color where the blocks can be red or green or blue or yellow. Initially, there may not be any blocks present and so the robot must utilize a scan action to survey the area until an appropriately colored block can be picked up and moved from the table to the bin. A scan operation reveals a new block, if it was "placed" on the table. The placement can be assumed to be done by a human user. The pick-and-place action picks a block and moves it to the bin. Note that the reachable state space of this domain grows rapidly as the number of blocks on the table increases, as each block can be at different locations. Given an agent with only two scan and pick-and-place actions at its disposal, we experimented with two core task types: placing all blocks found during scanning into the bin or placing only blocks of a certain chosen color into the bin.

Data-Collection Procedure

We found that annotators were more inclined to specify positive over negative behavior in their instructions. For instance, an attempt to collect data for behavior matching the command "go to the green and avoid the yellow room" would often result in commands where users would instruct the robot to navigate to the green room utilizing whichever rooms were designated under the positively labeled images. Although technically correct, these instructions pose an obstacle as the intended, ground-truth GLTL expression (containing, for example, the token for the yellow room) would never include a symbol with semantic meaning associated with the rooms mentioned (for example, the blue or red rooms). In order to address this problem, a manual relabeling of data was performed such that samples whose instruction did not align to the intended GLTL formula were instead mapped to the corresponding GLTL formula consistent with the instruction. Filtering commands that reflected a clear misunderstanding of the annotation task resulted in parallel corpora consisting of 501 and 345 commands for the mobile-manipulation and patrol domains respectively. In aggregate, these commands reflected a total of 15 and 2 unique GLTL expressions respectively. Examples of natural language commands and their corresponding GLTL formulae can be seen in FIG. 2.

An Amazon Mechanical Turk (AMT) user study was conducted in order to collect data for training our neural sequence-to-sequence grounding models mapping natural language commands to GLTL expressions in each of our domains. To construct the parallel corpus, annotators were presented with static images (for Cleanup World) and short video clips (for pick-and-place) depicting a particular robot behavior. Users were then asked to provide a single sentence instruction that would induce the observed behavior. For the mobile-manipulation robot domain, sample images provided to AMT annotators can be seen in FIG. 1. Specifically, these images were displayed to users with positive (green arrow) and negative (red arrow) labels so that annotators could infer the constraint being placed on the robot's execution.

In order to supply additional data for the mobile-manipulation domain, we utilized a subset of the Cleanup World dataset consisting of 356 agent navigation and block manipulation commands, swapping their Markov reward function representation for the GLTL equivalent. Together, the combined dataset denotes the original dataset for the mobile manipulation domain used throughout all of our experiments. The pick-and-place domain original dataset received no extra commands. To further expand on the data present for learning across both domains, a synthetic data expansion procedure was applied to both datasets. Excluding the minority of commands pertaining to block manipulation behavior, all other commands were mapped to new commands through the substitution of color words in the natural language and the equivalent swapping of atoms in the corresponding GLTL expressions. For example, the command "move to the red room" and corresponding expression OR would be mapped to three new language commands (one for each of the blue, green and yellow rooms) along with the corresponding GLTL expressions ($\Diamond B$, $\Diamond G$, $\Diamond Y$). This expansion resulted in two expanded datasets for each of the domains consisting of 3382 and 745 commands respectively reflecting a total of 39 and 5 unique GLTL expressions.

Language Grounding

We conducted 5-fold cross validation experiments across three grounding models and present the language grounding accuracy means and standard deviations in the Table shown in FIG. 3. Results were averaged over 3 independent trials with distinct random seeds. For each instance, correctness was determined by comparing the complete, greedily-decoded GLTL formula to ground truth. Training was done using two independent parallel corpora, one for each of the domains outlined in above. Additionally, we reported results on both the original datasets, consisting of natural language commands exactly as collected through AMT, and the expanded datasets synthetically generated via the procedure described below. Notably, we find that all three models exhibit roughly identical performance despite the use of two different attention mechanisms. We suspect that the lack of an effect is due to the dramatically smaller vocabulary size of GLTL by comparison to traditional neural machine translation problems. However, we do find the use of an attention mechanism to have some effect on enabling generalization and the inference logical forms not seen during training.

In order to establish how well each grounding model captures the semantics of natural language and GLTL expressions, we conducted an experiment to assess the capacity for each model to infer novel GLTL expressions. Focusing on the mobile manipulation domain, we randomly sampled varying percentages of the 39 unique GLTL expressions represented across the collected within the expanded corpus of 3382 commands. All samples in the parallel corpus associated with the random sampled commands were used as training data while the entire remainder of the corpus was treated as a held-out test set consisting only of GLTL expressions not seen during training. The results of the experiment are shown in FIG. 4 with error bars denoting 95% confidence intervals computed over 10 independent trials. On average, we find that our encoder-agnostic attention scheme is slightly more adept at generalizing to novel commands. The results altogether, however, suggest that this type of generalization is still an open challenge for these models that traditionally excel in standard neural machine translation tasks that enjoy access to vast quantities of parallel training data. We believe that adapting these techniques to better operate in the extremely low resource area of robot language learning is an important direction for future research.

To demonstrate the efficacy of our approach, we translated our mobile-manipulation domain into the physical world with a TurtleBot agent. TurtleBot is a low-cost, personal robot kit with open source software. The problem space focused on constrained execution tasks requiring the robot the enter a goal room while either avoiding or passing through specific rooms. As in simulation, our physical setup consisted of four rooms uniquely identified by color and the agent's position in the world was tracked by a motion capture system. Using the Robot Operating System (ROS) speech to text API, we converted speech utterances to natural language text that could be passed to a trained instance of our grounding model with Bandanau attention, producing a GLTL formula. Treating the Cleanup World MDP as the environment MDP and identifying the specification MDP of the GLTL formula, we combined the two MDPs and apply a standard MDP planning algorithm to generate robot behavior in real time. The planning is real time as the formulae for these tasks are not very long and GLTL allows fast planning. The primitive north, south, east, west actions of the Cleanup Domain agent were converted into a series of low level ROS Twist messages using hand-written controllers.

In summary, we demonstrated an approach for mapping between English commands and LTL expressions through neural sequence-to-sequence learning models. We presented techiques for data augmentation and a novel attention mechanism that enables the system to map between novel English commands and novel LTL expressions not encountered at training time so long as the constituent LTL atoms have been previously observed. We demonstrated this approach within two domains for mobile-manipulation and pick-and-place tasks as well as on a physical robot.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
    enabling a robot to learn a mapping between English language commands and Linear Temporal Logic (LTL) expressions, wherein neural sequence-to-sequence learning models are employed to infer a LTL sequence corresponding to a given natural language command, wherein geometric LTL (GLTL) paired with a Markov Decision Process (MDP) is used to find policies corresponding to LTL expressions.
2. The method of claim 1 wherein the Markov Decision Process is a five-tuple (S, A, R, T, $\gamma$) where S defines the robot state space, A specifies the actions available to the robot, R encodes the underlying task through numerical rewards defined for each state-action pair, T defines the probabilistic transition dynamics of the environment, and $\gamma$ is a discount factor.

3. The method of claim 2 wherein given the Markov Decision Process as input, a planning algorithm produces a policy that maps from states to robot actions.

4. The method of claim 3 wherein each atomic proposition of a GLTL expression has an associated three-state MDP consisting of an initial, accepting, and rejecting state.

* * * * *